Oct. 2, 1951  W. V. THELANDER  2,569,503
CLUTCH PLATE
Original Filed Feb. 17, 1943  2 Sheets-Sheet 1

Inventor
W. Vincent Thelander
Atty

Oct. 2, 1951   W. V. THELANDER   2,569,503
CLUTCH PLATE

Original Filed Feb. 17, 1943   2 Sheets-Sheet 2

Inventor:
W. Vincent Thelander
By McCanna, Wintercorn
& Morsbach   Attys.

Patented Oct. 2, 1951

2,569,503

UNITED STATES PATENT OFFICE 2,569,503

CLUTCH PLATE

W. Vincent Thelander, Auburn, Ind., assignor to Dana Corporation, Toledo, Ohio, a corporation of Virginia Original application February 17, 1943, Serial No. 476,133, now Patent No. 2,520,180, dated August 29, 1950. Divided and this application January 5, 1950, Serial No. 137,024

4 Claims. (Cl. 267—1)

This application is a division of my copending application, Serial No. 476,133, filed February 17, 1943.

This invention relates to motion transmitting elements, and is more particularly concerned with improvements in friction clutch plates for automotive use.

The principal object of my invention is to provide a clutch plate having spring means between the relatively oscillatory inner and outer elements of the plate for cushioning purposes and incorporating fluid damping means in the hub to eliminate the tendency for the springs and other portions of the hub structure to sound-off under certain conditions in the operation of the clutch.

In my Patents 2,337,134 and 2,337,135, issued December 21, 1943, I disclosed as part of the fluid damping means an interfitting piston and cylinder associated with each of a plurality of coiled compression springs forming the spring cushioning means, the piston and cylinder serving not only to form a fluid pumping device using the fluid damping medium as its working fluid to give increased cushioning action in one direction and in the other direction check the recoil of the springs so as to smoothen the drive, but also serving as a spring retainer so as to prevent rubbing contact between the spring and adjacent portions of the plate. An important object of my present invention is to provide a piston and cylinder of improved construction with a view to improving the hydraulic action and enabling quantity production of clutch plates of this kind, all adhering closely to a predetermined standard of performance.

A salient feature of the clutch plate of the present invention lies in the provision of a relatively loose fitting piston in the working cylinder, the piston being equipped with an enlarged rubber seal ring, which gives a substantially perfect seal while compensating by the distortion thereof for whatever angularity the piston may assume in the bore of the cylinder, so that there is definite freedom from any danger of the parts seizing or binding and the parts need not be manufactured to such close tolerances, improved hydraulic action being obtained because of the fact that there is substantially no leakage past the piston with such a construction and negligible frictional resistance to movement, substantially the entire resistance to movement being that occasioned by the flow of the working fluid through a port of predetermined size provided in the wall of the cylinder.

The invention is illustrated in the accompanying drawing, in which—

Similar reference numerals are applied to corresponding parts in these three views.

Figure 1:
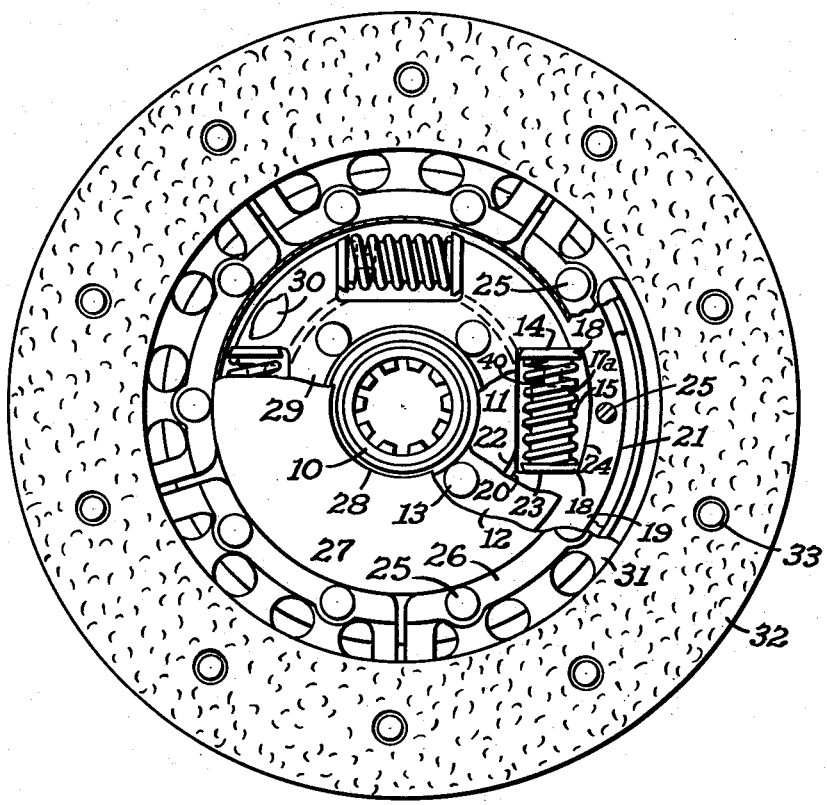
Fig. 1 is a rear view of a clutch plate embodying my invention, showing approximately half of the hub housing plate broken away so as to better illustrate the hub construction.
Figure 2:
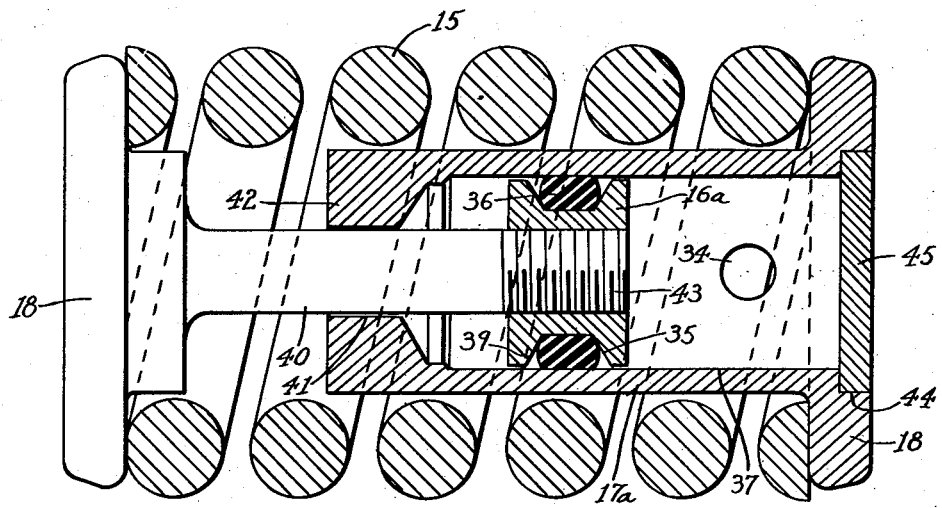
Fig. 2 is a sectional view of one of the piston and cylinder assemblies of Fig. 1, on an enlarged scale, showing the same in connection with the associated coiled compression spring.

Referring to Figs. 1 and 2, the clutch plate shown comprises relatively rotatable inner and outer portions, the inner portion being formed by a center hub 10 splined for driving connection with the driving shaft of an automotive transmission and provided with an annular flange 11 onto opposite sides of which two circular sheet metal plates 12 are riveted, as indicated at 13. These plates have a plurality of equally circumferentially spaced openings 14 provided therein, four in the present instance, one for each of a plurality of spring cushioning means 15, the openings in the two plates being in register with one another. Assembled in each opening 14 with the spring 15 is a piston 40 and cylinder 17a extending into the spring from opposite ends and provided with enlarged circular head ends 18, larger in diameter than the spring so as to space the ends of the spring from adjacent portions of the plate and avoid wear on the end coils. Inasmuch as the present invention is primarily concerned with improvements in the piston 40 and cylinder 17a, those parts will be described in greater detail hereinafter. A ring 19, the inner and outer peripheries 20 and 21 of which are in concentric relation with the periphery 22 of the flange 11, has notches 23 cut therein in register with the openings 14 and is disposed between the plates 12 for engagement of the ends of the notched portions 23 with the spring cushioning means, the drive being taken at one end of the notched portions 23 and by the respectively opposite ends of the openings 14, in a manner well understood in this art. The radially outer sides 24 of each of the notches 23 in the ring 19 are struck on arcs concentric with the inner and outer peripheries 20 and 21, and the head ends 18 of the pistons 40 and cylinders 17a are tapered, as indicated, to conform to these arcs 24. The ring 19 is riveted at circumferentially spaced points, as indicated at 25, between the peripheral flanges 26 of two sheet metal housing plates 27. The latter have central circular openings 28 through which the end portions of the hub 10 project. The plates 27 define therebetween an annular oil or grease chamber 29 filled with a heavy lubricating oil or grease, a small portion of which is indicated at 30. Gaskets, preferably of an oil resistant rubber, such as neoprene, are preferably provided between the outer marginal portions of the plates 27 and around the inner marginal portions thereof, as disclosed in my Patent 2,337,135, to seal the chamber 29 against leakage of the oil or grease 30. Stampings 31, as also disclosed in said patent, are riveted with the housing plates 27 to the ring 19 by rivets 25 and have the annular facing rings 32 secured thereon, as indicated at 33.

In operation, when relative movement takes place between the inner and outer portions of the clutch plate, the springs 15 are compressed to cushion the drive. At the same time the heavy oil or grease 30 with which the cylinders 17a are filled is discharged from one end of cylinders 17a through bleeder holes 34 while some oil or grease is simultaneously drawn into the other end through holes 41, so that these pumping devices add materially to the cushioning effect, accordingly relieving the springs 15 of some of the load. The recoil action of the springs 15 is also checked by the pistons and cylinders 16—17, because their return to normal extended relationship is also retarded as a result of discharge of heavy oil or grease from the other end of the cylinders through holes 41 and as a result of the restriction of the bleeder holes 34 through which the heavy oil or grease must flow in refilling the cylinders 17a. In that way the secondary vibrations are absorbed and a smooth drive is obtained. In contrast to clutch plates employing friction braking means to resist the return of the parts to normal relationship after compression of the springs, the present piston and cylinder construction with the heavy grease or oil 30 affords the desired checking action without perceptible wear on the relatively movable piston and cylinder parts inasmuch as the oil or grease serves to lubricate these parts. In addition, the oil or grease 30 serves for dampening or sound deadening. The oil or grease absorbs the primary vibrations substantially entirely, and working with the pistons and cylinders serves to substantially completely dampen secondary vibrations. The springs 15 cannot sound-off due to vibration, because they are immersed in the heavy oil or grease, and this heavy oil or grease has the same sound deadening effect upon all of the other parts with which it is in contact.

In accordance with my invention, the head end 16a of piston 40 is made sufficiently undersize to fit fairly loosely in cylinder 17a, that is to say, with more than the ordinary working clearance, and has an annular groove 35 provided therein in which is seated a ring 36 of neoprene— a synthetic rubber which is impervious to oil. The seal ring 36 has an inside diameter large enough to permit slipping the ring over the end of the piston and into the groove without too much stretching and, on the other hand, small enough to insure a certain amount of pressure of the ring circumferentially on the bottom of the groove 35 when the ring is in place. The outside diameter of the seal ring is large enough in relation to the inside diameter of the bore 37 of the cylinder 17a to insure a tight sealing fit in the bore when the ring is forced into the bore and thereby compressed from a normally rectangular section to the barrel-shaped section shown in Fig. 2. It should be apparent that when the piston with the seal ring thereon is entered in the bore an improved hydraulic action is obtained, because the seal ring 36 conforms to the bore 37 in any and all positions of the piston regardless of whatever variation in shape or size there may be at one or more points. As a result, plates made in accordance with my invention may be manufactured in large quantities with reasonably good assurance of all of the plates adhering closely to a given standard of performance, and such good performance is furthermore assured for a much longer period of service, inasmuch as the size of the bleeder hole 34 in one end of the cylinder and the hole 41 in the other end are the only controlling factors in the operation of the piston and cylinder assembly, instead of being only two of many factors where a plain piston is employed, it being, of course, understood that the bleeder holes 34 and 41 may be reduced or increased in size in the application of clutch plates of the present invention to different makes and sizes of cars. The piston is kept substantially centered and therefore evenly spaced circumferentially with respect to the surrounding wall of the cylinder, and in that way frictional resistance to movement is reduced to a minimum and there is no appreciable wear on the piston 40 and cylinder 17a, whereas if the assembly depended upon a close working fit of the piston in the cylinder to prevent leakage around the piston, the wear would soon make itself apparent in the poorer hydraulic action obtained and there would be meanwhile too much resistance to relative movement and also too much danger of the piston seizing or binding, especially if the piston expanded enough with change of temperature. The rubber seal ring gives a universal joint action in so far as accommodating itself to whatever angularity the piston might assume in the bore is concerned, and it gives the same substantially perfect sealing action regardless of whatever slight inclination the piston may assume in the bore. The side walls of the groove 35 diverge outwardly, as indicated at 39, so that the seal ring 36 can be compressed radially to barrel-shaped section to the extent indicated without being jammed into tight contact with the side walls of the groove and being thereby restrained so far as its freedom of action is concerned, this construction also allowing greater freedom and flexibility of operation of the piston in the cylinder. A counterbore 44 is provided in the open end of the cylinder 17a to receive the closure 45, which can be secured in place in any suitable or preferred manner. The hole 41 is centrally located in the other end of the cylinder 17a and the rod portion of piston 40, which is threaded, as at 43, in the head 16a extends so freely through this hole that the universal wobble motion of the piston in the cylinder mentioned above is permitted, the area of restricted opening left between the rod and this hole being either equal to a certain fraction of or equal to the area of hole 34. It should be apparent that I may increase the size of the hole 41 or decrease the size of the piston rod 40 in addition to decreasing or increasing the size of the bleeder hole 34 to suit given requirements. This design with the double-action piston, therefore, is easily varied to suit a given application.

Figure 3:
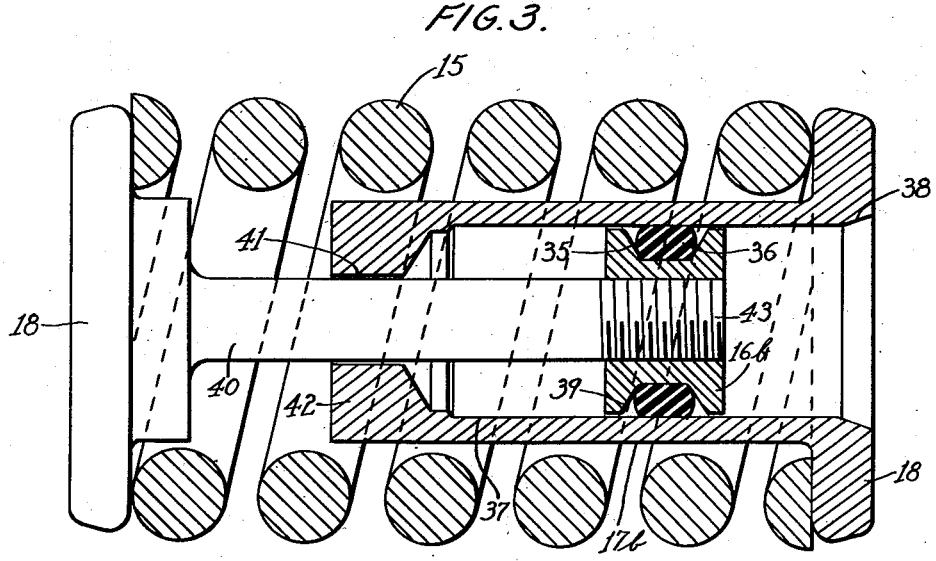
Fig. 3 is a view similar to Fig. 2 showing a modified or alternative construction.

The construction shown in Fig. 3 is closely similar to that of Fig. 2, and, it will be understood, is also adapted for use with the springs 15 in the clutch plate of Fig. 1 as a substitute for the construction of Fig. 2. In this construction an open ended cylinder 17b is provided and the piston 16b is single-acting, and resistance to movement is determined entirely by the resistance to flow through the hole 41 in the end wall 42, there being no bleeder hole 34 as in the other construction. Manifestly, the size of the hole 41 may be increased or decreased, or the size of the piston rod 40 may be increased or decreased, to suit requirements. The piston 16b has a loose fit in the bore 37 and has a rubber seal ring 36 in the groove 35 thereof operating in the same way as the seal ring of Fig. 2. The operation of this device is substantially the same as that of Fig. 2.

It is believed the foregoing description conveys a good understanding of the objects and advantages of my invention. The appended claims have been drawn to cover all legitimate modifications and adaptations.

I claim:

1. A liquid shock absorber unit for a friction clutch of the type including relatively oscillatable members between which the shock absorber unit is mounted for transmitting driving force from one of said members to the other, said unit comprising a cylinder having a wall closing at least one end in which a central hole is provided and having a head portion on the other end for abutting one of the oscillatable clutch members, an undersize piston having a loose fit and being capable of limited rocking motion in the cylinder, said piston including a rod portion extending freely through the aforesaid central hole with a loose fit therein and having a head portion on its outer end outside the cylinder for abutting the other oscillatable clutch member, said piston having an annular groove and a resilient rubber sealing ring seated in the bottom of said groove under radial compression between the same and the walls of the cylinder to have sealing engagement therewith, the width of the outer portion of the annular groove being greater than that of the rubber sealing ring, the loose fit of the piston in the cylinder being such as to permit limited rocking action of the piston in the cylinder about said resilient rubber sealing ring, whereby to eliminate any tendency of said piston to bind in the cylinder upon application of force on said cylinder and piston along lines extending at an angle to the axis thereof upon relative oscillating motion of said clutch members, and the loose fit of the rod portion of said piston in the central hole limiting the rocking motion of the piston in the cylinder, and the restricted opening left in the central hole annularly of the rod portion of said piston serving as a bleeder hole for the inlet and outlet of liquid in the relative reciprocation of the piston and cylinder.

2. In a liquid dampened clutch plate comprising relatively oscillatable inner and outer members, a coiled compression spring for resisting relative rotary movement between the inner and outer members, an interfitting piston and cylinder associated with said spring and normally held in extended relation to one another by the spring, the cylinder extending axially into the spring from one end and the piston extending axially into the spring from the other end, the piston and cylinder each having an enlarged substantially circular head portion on the outer end thereof for abutment on the inner side thereof with the adjacent ends of the spring, respectively, and transmitting pressure to the spring to compress the same in the relative rotary movement between the inner and outer members, the improvement which consists in that the cylinder has a wall closing at least the inner end in which a central hole is provided, and in that the piston is undersize with respect to the bore of the cylinder and has a loose fit and being capable of limited rocking motion therein, said piston having an annular groove and a resilient rubber sealing ring seated in the bottom of said groove under radial compression between the same and the cylinder wall to center the piston in the cylinder and seal the passage between the same, the width of the outer portion of the annular groove being greater than that of the rubber sealing ring, and the loose fit of the piston in the cylinder permitting limited rocking motion of the piston in the cylinder with said rubber sealing ring as a fulcrum, whereby to eliminate any tendency of said piston to bind in the cylinder upon relative oscillatory motion of said inner and outer members with resultant application of pressure on the cylinder and piston along lines at an angle to the axis thereof, the piston including a rod portion extending freely through the aforesaid central hole with a loose fit therein for connection with the enlarged head portion on the outer end thereof, the loose fit of the rod portion of said piston in the central hole limiting the rocking motion of the piston in the cylinder, and the restricted opening left in the central hole annularly of the rod portion of said piston serving as a bleeder hole for the inlet and outlet of liquid in the relative reciprocation of the piston and cylinder.

3. A liquid shock absorber unit for a friction clutch of the type including relatively oscillatable members between which the shock absorber unit is mounted for transmitting driving force from one of said members to the other, said unit comprising a cylinder having a wall closing one end in which a central hole is provided and having a head portion on the other end for abutting one of the oscillatable clutch members, an undersize piston having a loose fit and being capable of limited rocking motion in the cylinder, said piston including a rod portion extending freely through the aforesaid central hole with a loose fit therein and having a head portion on its outer end outside the cylinder for abutting the other oscillatable clutch member, said piston having an annular groove and a resilient rubber sealing ring seated in the bottom of said groove under radial compression between the same and the walls of the cylinder to have sealing engagement therewith, the width of the outer portion of the annular groove being greater than that of the rubber sealing ring, the loose fit of the piston in the cylinder being such as to permit limited rocking action of the piston in the cylinder about said resilient rubber sealing ring, whereby to eliminate any tendency of said piston to bind in the cylinder upon application of force on said cylinder and piston along lines extending at an angle to the axis thereof upon relative oscillating motion of said clutch members, and the loose fit of the rod portion of said piston in the central hole limiting the rocking motion of the piston in the cylinder, and the restricted opening left in the central hole annularly of the rod portion of said piston serving as a bleeder hole for the inlet and outlet of liquid in the relative reciprocation of the piston and cylinder, said cylinder having a wall closing the other end, and means affording restricted inlet and outlet of liquid to and from that end of said cylinder upon relative reciprocation of the piston and cylinder.

4. In a liquid dampened clutch plate comprising relatively oscillatable inner and outer members, a coiled compression spring for resisting relative rotary movement between the inner and outer members, an interfitting piston and cylinder associated with said spring and normally held in extended relation to one another by the spring, the cylinder extending axially into the spring from one end and the piston extending axially into the spring from the other end, the piston and cylinder each having an enlarged substantially circular head portion on the outer end thereof for abutment on the inner side thereof with the adjacent ends of the spring, respectively, and transmitting pressure to the spring to compress the same in the relative rotary movement between the inner and outer members, the improvement which consists in that the cylinder has a wall closing the inner end in which a central hole is provided, and in that the piston is undersize with respect to the bore of the cylinder and has a loose fit and being capable of limited rocking motion therein, said piston having an annular groove and a resilient rubber sealing ring seated in the bottom of said groove under radial compression between the same and the cylinder wall to center the piston in the cylinder and seal the passage between the same, the width of the outer portion of the annular groove being greater than that of the rubber sealing ring, and the loose fit of the piston in the cylinder permitting limited rocking motion of the piston in the cylinder with said rubber sealing ring as a fulcrum, whereby to eliminate any tendency of said piston to bind in the cylinder upon relative oscillatory motion of said inner and outer members with resultant application of pressure on the cylinder and piston along lines at an angle to the axis thereof, the piston including a rod portion extending freely through the aforesaid central hole with a loose fit therein for connection with the enlarged head portion on the outer end thereof, the loose fit of the rod portion of said piston in the central hole limiting the rocking motion of the piston in the cylinder, and the restricted opening left in the central hole annularly of the rod portion of said piston serving as a bleeder hole for the inlet and outlet of liquid in the relative reciprocation of the piston and cylinder, the improvement consisting further in that said cylinder has a wall closing the outer end, and means affording restricted inlet and outlet of liquid to and from that end of said cylinder upon relative reciprocation of the piston and cylinder.

W. VINCENT THELANDER.

REFERENCES CITED

The following references are of record in the file of this patent:

UNITED STATES PATENTS

| Number | Name | Date |
| --- | --- | --- |
| 879,058 | Little | Feb. 11, 1908 |
| 1,423,904 | Blyburg | July 25, 1922 |
| 2,316,820 | Thelander | Apr. 20, 1943 |
| 2,360,731 | Smith | Oct. 17, 1944 |